United States Patent
Monaghan et al.

(10) Patent No.: US 6,244,626 B1
(45) Date of Patent: Jun. 12, 2001

(54) TRIM COMPONENT WITH ENERGY ABSORBING FOR A SAFETY HARNESS

(75) Inventors: Michael Thomas Monaghan, Hall Green (GB); Richard Hahnekamp, Eisenstadt; Wolfgang Walter, Himberg, both of (AT)

(73) Assignees: Rover Group LTD, Warwick (GB); Magna Eybl GmbH, Ebergassing (AT)

( * ) Notice: Subject to any disclaimer, the term of this patent is extended or adjusted under 35 U.S.C. 154(b) by 0 days.

(21) Appl. No.: 09/332,642

(22) Filed: Jun. 14, 1999

(51) Int. Cl.[7] .................... B60R 22/28; B60R 22/20; B60R 22/24
(52) U.S. Cl. ...................... 280/805; 280/801.2
(58) Field of Search ............... 280/801.2, 805, 280/751, 801.1, 808; 297/470; 188/371, 377

(56) References Cited

U.S. PATENT DOCUMENTS

| | | | |
|---|---|---|---|
| 3,930,665 | * 1/1976 | Ikawa | 280/150 B |
| 5,641,195 | * 6/1997 | Patel et al. | 296/189 |
| 5,685,566 | * 11/1997 | Hirase et al. | 280/801.1 |
| 5,746,419 | * 5/1998 | McFadden et al. | 267/140 |
| 5,779,270 | * 7/1998 | Tanaka | 280/808 |
| 5,826,907 | * 10/1998 | Saito et al. | 280/808 |
| 5,842,719 | * 12/1998 | Tanaka | 280/805 |
| 5,863,069 | * 1/1999 | Wickenheiser et al. | 280/751 |
| 6,007,100 | * 12/1999 | Steffens, Jr. | 280/801.1 |

FOREIGN PATENT DOCUMENTS 2309152  7/1997 (GB).

* cited by examiner

Primary Examiner—Brian L. Johnson
Assistant Examiner—Tony Winner
(74) Attorney, Agent, or Firm—Paul E Milliken; Ray L Weber

(57) ABSTRACT

A trim component (10) for a vehicle door post (11) having a seat belt mounting (17) secured thereto, the component comprising a body shell (12) with at least one energy absorbing member (24) mounted on the reverse side (16) of the body shell. The member (24) has an aperture (34) therein through which seat belt webbing (19) in use passes, and is slidable relative to the shell (12) to accommodate belt path adjustments.

12 Claims, 3 Drawing Sheets

TRIM COMPONENT WITH ENERGY ABSORBING FOR A SAFETY HARNESS

FIELD

This invention relates to trim components and in particular to trim components for use with safety harnesses, in particular but not exclusively for use on motor vehicles.

BACKGROUND OF INVENTION

In typical motor cars the driver and front passenger are held in their seats by a harness comprising a lap belt and a single diagonal belt that extends through a mounting or anchorage, secured on the adjacent door post, to a releasable lock located towards the middle of the vehicle. The mounting on the door post is typically fixed in position by a large bolt. The upper seat belt mountings on the door post can give rise to injuries if the wearer's head impacts the mounting during a collision.

Trim components having energy absorbing structures on the reverse side, between the trim surface and the door post, are known, see for example EP-A-0736422. However a particular problem arises with door post trim components. If the mounting is to be cushioned then the harness needs to pass through the trim component. The path taken by the seat belt webbing when in use in the vehicle will vary depending upon the distance that the car seat is from the door post and the height of the wearer.

OBJECT OF THE INVENTION

The present invention will provide a means for covering a seat belt mounting with an energy absorbent member, and provides a trim component that allows for changes in seat belt path when in use.

STATEMENTS OF INVENTION

According to the present invention, there is provided a trim component for a vehicle structural member having a seat belt mounting secured thereto, the component comprising a body shell, at least one energy absorbing member mounted on the reverse side of the body shell, and the member having an aperture therein through which seat belt webbing in use passes, being slidable relative to the shell to accommodate changes or adjustments in the belt path.

When adapted for use with a seat belt mounting which is slidable on the structural member, the trim component may be provided with an energy absorbing member having a socket formed therein to receive a portion of the mounting or its fastener.

The energy absorbing member preferably includes a pair of opposed walls with collapsible ribs extending between the two walls. The ribs can be arranged as is desired, for example in parallel, as chevrons in a lattice work, as a series of cell walls similar to a honey comb, or other suitable cell shape.

The member may slide with one wall in direct contact with the reverse side of the shell or may be formed as a separate pad which is mounted on an intermediate sliding member located adjacent the shell. The energy absorbing member or sliding member is slidably mounted to the shell by clips and/or slideways formed integrally with the body shell.

The shell is preferably a plastics moulding formed from polypropylene, high density polyethylene, or acrylonitrile styrenebutadiene (ABS).

Preferably, said slide member, or the said one wall of the energy absorbing member has a portion that extends in at least one direction beyond the opposing other wall and the aperture for the webbing is located in said extending portion to one side of the pad.

For a component covering the door post, that is the B post, or B and C post, the seat belt mounting is typically at head height and the energy absorbing member could be utilised to mask a large aperture in the body shell provided to accommodate the extremes of positioning of the seat belt webbing in use, and the extending portion in use projects vertically downwards.

Also according to the invention there is provided a method of protecting a seat belt mounting affixed to a structural member of a vehicle for guiding a seat belt, wherein the structural member and seat belt mounting are both covered by a decorative trim component comprising a body shell with at least one energy absorbing member mounted on the reverse side of the body shell to cushion impacts against said structural member and seat belt mounting, the energy absorbing member having an aperture therein through which seat belt webbing passes and being movable relative to the shell to accommodate changes in the belt path.

DESCRIPTION OF DRAWINGS

The invention will be described by way of example and with reference to the accompanying drawings in which.

DETAILED DESCRIPTION OF THE INVENTION

Figure 1:
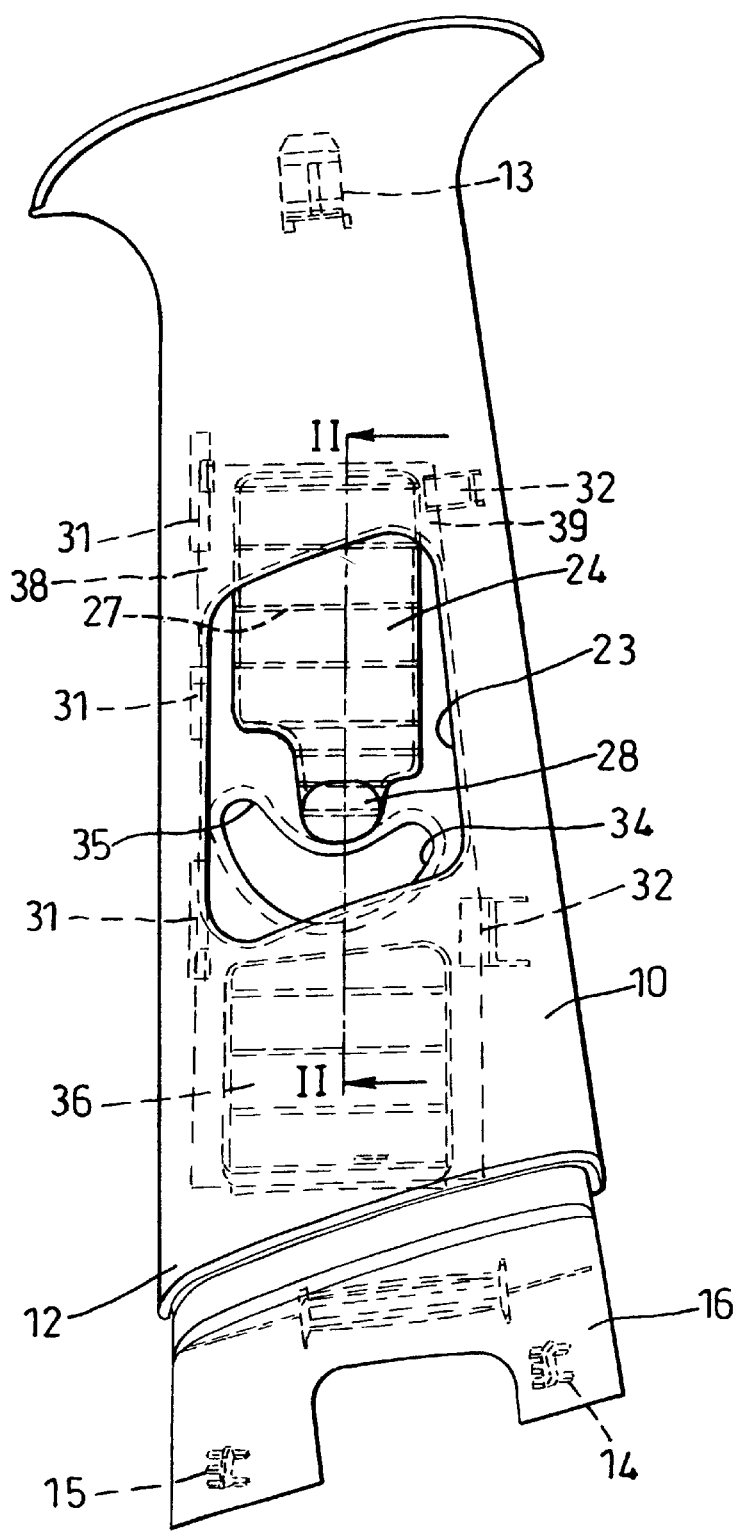
FIG. 1 is a plan view of the exposed side of a trim component for a door post of a motor vehicle, showing the invention.
Figure 2:
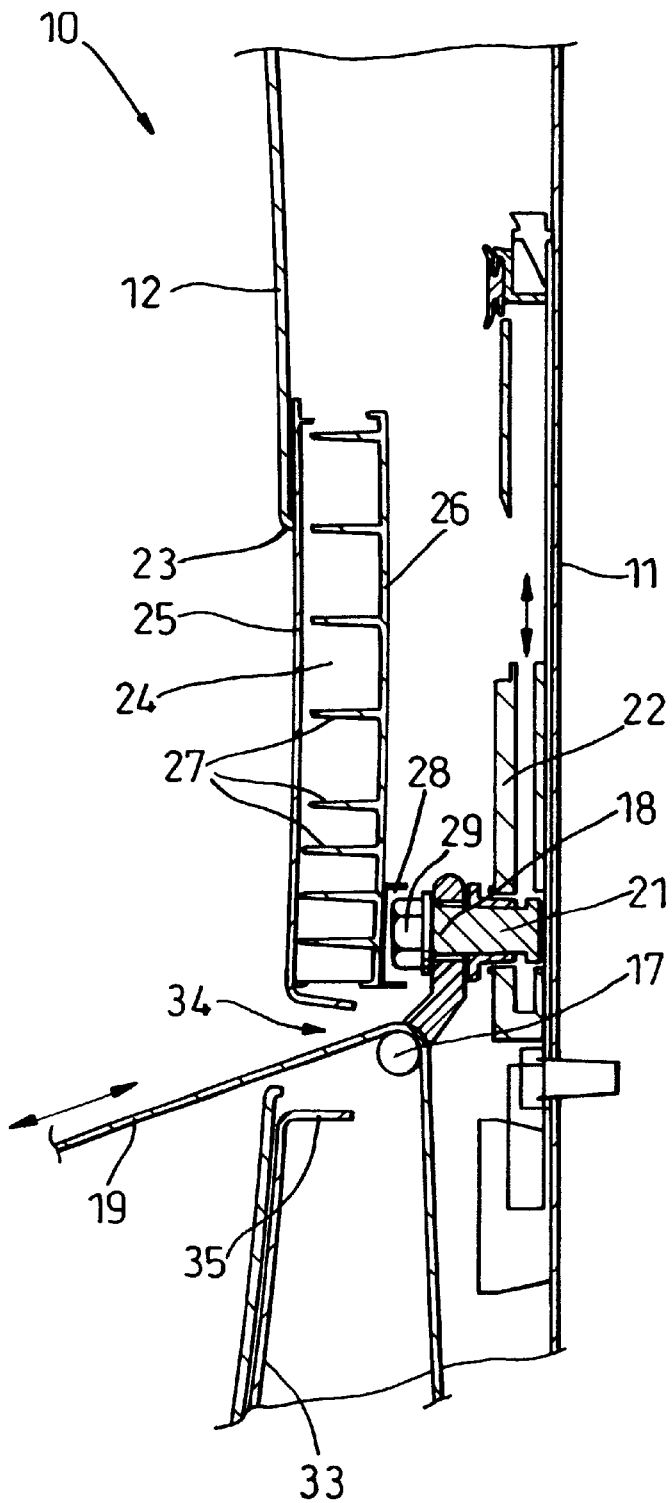
FIG. 2 is a section on the line II—II of FIG. 1.

A trim panel 10 for a B and C door post 11 of a motor car is shown in FIGS. 1 and 2 of the drawings. The trim panel 10 is injection moulded from a suitable plastics material such as polypropylene and has a body shell 12, which may be decorative or covered in decorative material, and which has integral clips 13, 14, 15 on the reverse side 16. The clips 13–15 are used for securing the trim panel 10 to the door post 11.

The door post 11 provides a structural member to which a seat belt mounting 17, typically the upper mounting, is secured by a fastener 18. The mounting 18 provides a guide for the belt 19 as it is drawn from, or retracted onto, the belt storage reel (not shown) which may be located in the lower portion of door post 11. This will typically be an inertia reel seat belt. The upper mounting fastener 18 is fixed to a slide mechanism 21 which is mounted in a slotted track 22 for vertical movement to provide a height adjustable seat belt.

The shell 12 of the trim panel 10 has a large aperture 23 therein through which the belt 19 passes. The aperture 23 must be of a size that accommodates the belt 19 over the entire range of its adjustment. An energy absorbing member 24 is located between the reverse side 16 of the shell 12 and the seat belt mounting and fastener 18.

The energy absorbing member 24 comprises a pair of opposing planar walls 25, 26 with collapsible ribs 27 extending between the two walls. The member 24 may comprise an assembly in which the wall 26 adjacent the post 11 is a plastics moulding having the ribs 27 formed integrally therewith, and the other wall 25 is also a plastics moulding secured to the ribs 27 by welding techniques, for example by ultra sonic welding. The wall 26 has a socket 28 integrally moulded therein which in use fits over the head 29 of the fastener 18 and the wall 25 slides in contact with the reverse side 16 of the shell 12.

The ribs 27 can be arranged in any desired pattern, for example in a lattice work, or the ribs 27, as shown, may extend across the full width of the pad and are arranged in parallel. Alternatively a collapsible cellular structure, such as a honeycomb, may be used.

The wall 25 adjacent the shell 12 is larger than the opposing wall 26 and extends beyond the other wall 26 both lengthways and sideways. The sideways edge margins 38, 39 of the wall 25 engage with clips 31 and 32 respectively on the rear surface 16 to guide the member 24 for vertical sliding movement. The downwards extension 33 of the wall 25 has a shallow "U" shaped aperture 34 formed therein with the lips 35 of the aperture 34 being turned inwardly towards the post 11. The aperture 34 is adjacent the member 24 and is located immediately beneath the socket 28.

In use the seat belt webbing 19 passes through the aperture 34 and adjustments in height of the seat belt will cause the member 24 to slide vertically with the belt and mounting 17. This ensures that the aperture 23 in the shell 12 of the trim panel 10 is always covered, and that the mounting 17 is always covered by a protective layer of energy absorbing material.

Optionally, a second energy absorbing member in the form of a pad 36 (FIG. 1 only) may be located on the downwards extension 33 of the wall 25. The pad 36 may have its wall adjacent the shell 12 formed integrally with the wall 25 of the upper pad 24, or may be formed separately and secured to the downwards extension by welding or adhesive means. The pad 36 may have the same energy absorbing structure as the upper pad or may differ in structure, whatever is desired.

Figure 3:
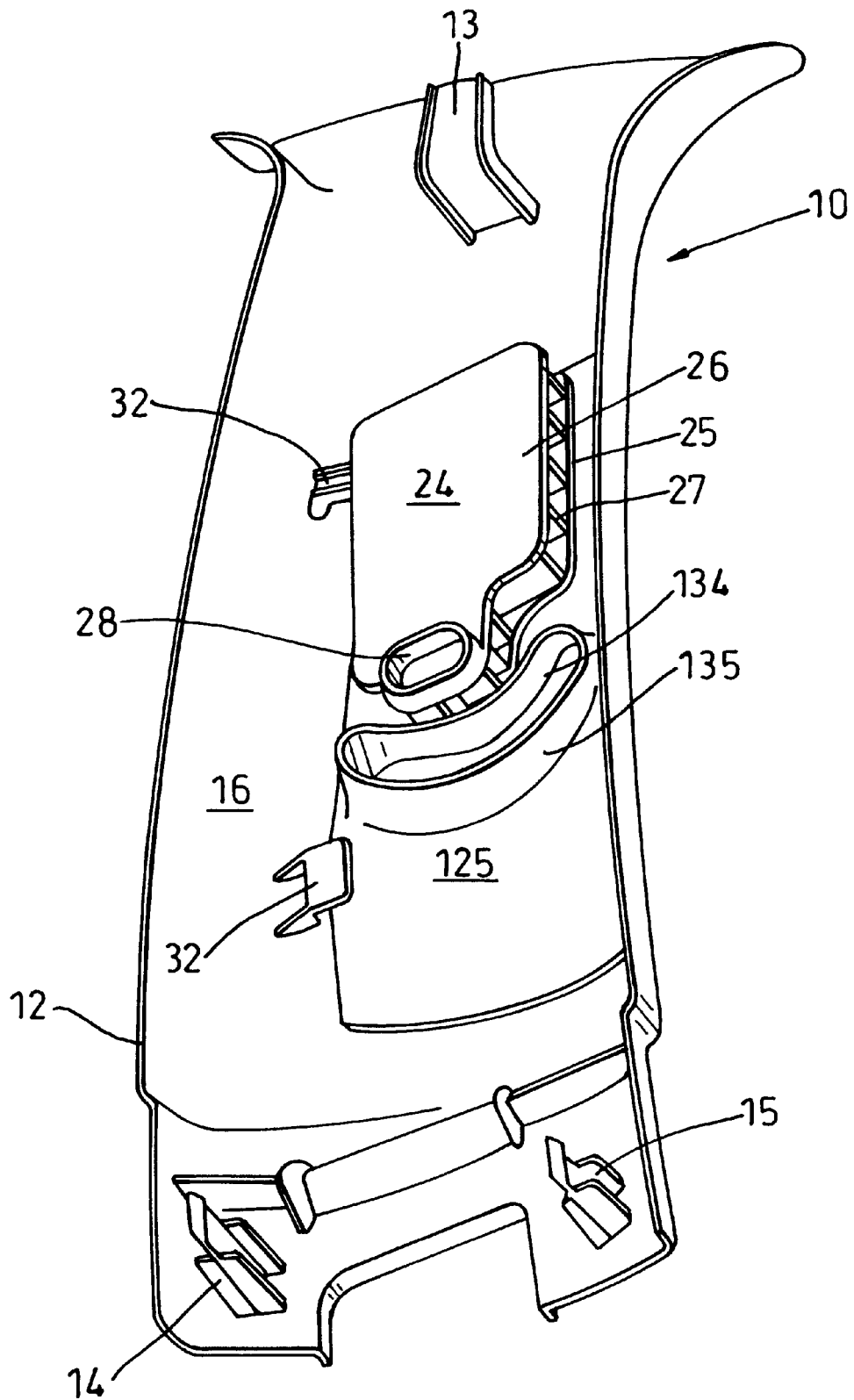
FIG. 3 is a plan view of the reverse side of the component of FIG. 1, showing a minor modification.

Another embodiment is shown in FIG. 3, in which an intermediate sliding member 125 is located on the reverse side 16 of the shell 12 and is guided for its movement by clips 31, 32 as before. The energy absorbing pad 24 is formed separately and is secured as a unit to the sliding member 125. The aperture 134 is formed in the sliding member adjacent the pad 24 as previously described. A second energy absorbing pad may be added to the lower portion of the sliding member 125 if required.

What is claimed is:

1. A trim component on a vehicle structural member having a seat belt mounting secured thereto by a fastener, the component comprising a body shell having a reverse side adjacent said structural member which covers said mounting, at least one energy absorbing member mounted to the reverse side of the body shell, the energy absorbing member having an aperture therein through which seat belt webbing in use passes, and being slidable relative to the shell to accommodate belt path adjustments.

2. A trim component as claimed in claim 1 adapted for use with a seat belt mounting which is slidable on the structural member, wherein said energy absorbing member has a socket formed therein to receive a portion of the seat belt mounting or its fastener.

3. A trim cover as claimed in claim 2 wherein the energy absorbing member includes a plurality of collapsible walls in the form of ribs or rigid cell walls.

4. A trim component as claimed in claim 3 wherein said member comprises a pair of opposing walls having ribs extending between the two walls.

5. A trim component as claimed in claim 4, wherein one of the two opposing walls of said energy absorbing member is slidably mounted on the reverse side of the shell.

6. A trim component as claimed in claim 4, wherein the ribs are formed integrally with the wall in use adjacent the structural member.

7. A trim component as claimed in claim 6, wherein the other wall adjacent the shell is welded to the ribs.

8. A trim component as claimed in claim 4, wherein said said one opposing wall has an portion that extends in at least one direction beyond the opposing other wall, and the aperture for the webbing is located in said extending portion to one side of the pad.

9. A trim component as claimed in claim 8, wherein a second energy absorbing member is mounted on said extending portion on the other side of the aperture.

10. A trim component as claimed in claim 1, wherein the energy absorbing member is slidably mounted to the shell by clips and/or slideways formed integrally with the body shell.

11. A method of protecting a seat belt mounting affixed to a structural member of a vehicle for guiding a seat belt, wherein the structural member and seat belt mounting are both covered by a decorative trim component comprising a body shell having a reverse side adjacent said structural member with at least one energy absorbing member mounted on the reverse side of the body shell to cushion impacts against said structural member and seat belt mounting, the energy absorbing member having an aperture therein through which seat belt webbing passes and being moveable relating to the shell to accommodate changes in the belt path.

12. A trim component as claimed in claim 4, the energy absorbing member further including an intermediate slide member slidably mounted on the reverse side of the shell and one of said two opposing walls is attached to said intermediate member.

* * * * *